Patented Mar. 23, 1948

2,438,335

UNITED STATES PATENT OFFICE 2,438,335

METHOD OF MAKING CERAMIC STAINS

John Alfred Earl, Pittsburgh, Pa., assignor to The Vitro Manufacturing Company, Pittsburgh, Pa., a corporation of Pennsylvania No Drawing. Application August 23, 1944, Serial No. 550,909

2 Claims. (Cl. 106—34)

This invention relates to a composition for and method of glazing ceramic wares, and it is among the objects thereof to provide a ceramic stain ranging from ivory through yellow, composed principally of zirconium oxide and vanadium oxide.

The limiting condition of a glaze for ceramic materials is in the main the firing temperature and the compositions in conventional use are modified in the proportions and kinds of materials to meet the requirements of a particular application. By means of the present invention, the same materials in varying proportions are productive of a color range from ivory to yellow shades at firing temperatures from Cone 010 to Cone 14 which is at temperatures from 1600° F. to 2600° F.

I have discovered that zirconium oxide can be made the carrier of minute particles of vanadium oxide and due to their chemical characteristics the resultant stain in varying proportions of these materials will impart to the glaze a yellow coloring of a wide range of shades and hues. More particularly I have discovered that a composition of zirconium oxide and vanadium salts, preferably ammonium metavanadate, in proportions ranging from 99 parts zirconium oxide to 1 part of ammonium metavanadate by weight to 80 parts zirconium oxide and 20 parts ammonium metavanadate by weight, produces desirable yellow glaze stains, body stains and under glaze colors.

In preparing the improved stain, zirconium oxide in the proportion of 99–80 parts by weight and ammonium metavanadate in the proportion of 1–20 parts by weight are calcined in a furnace at a temperature of about 2550° F., during which the vanadium compound is thoroughly and intimately absorbed and combined with the zirconium oxide. After cooling, the stain is ground to a fine subdivision and may be leached to remove any soluble salts. After drying it is ready for additions to the glaze as desired.

One of the important factors in the preparation of the zirconium oxide and vanadium oxide glaze stain is that it must be free of soda, as otherwise the soda will combine with vanadium and form soluble sodium vanadate which leaches out in the final stages of preparation of the stain, which will tend to procure weaker or less intense coloration, thus limiting its use in the art. By employing pure zirconium oxide and vanadium salts, preferably ammonium metavanadate, the soda may be eliminated.

Ceramic stains composed of zirconium oxide and vanadium compounds maintain uniform and clear color ranges when employed either as body stains or glaze stains and under glazes.

Although the invention has been described as a zirconium-oxide-vanadium oxide compound, it may be used as a base with other coloring materials to produce other shades.

I claim:

1. The method of making a ceramic stain ranging from ivory through yellow in shade, which comprises intimately mixing pure zirconium oxide with ammonium metavanadate, calcining the mixture in a furnace to a temperature of about 2550° F., and grinding the resultant product to a fine subdivision for adidtion to a glaze as described.

2. The method of making a ceramic stain ranging from ivory through yellow in shade, which comprises intimately mixing pure zirconium oxide from 80 to 99 parts by weight and ammonium metavanadate from 1 to 20 parts by weight, calcining the mixture in a furnace to a temperature of about 2550° F., and grinding the resultant product to a fine subdivision for addition to a glaze as described.

JOHN ALFRED EARL.

REFERENCES CITED

The following references are of record in the file of this patent:

UNITED STATES PATENTS

| Number | Name | Date |
|---|---|---|
| 572,095 | Atkins | Dec. 1, 1896 |
| 2,338,209 | Smith | Jan. 4, 1944 |